United States Patent [19]

Burt et al.

[11] Patent Number: 4,796,467
[45] Date of Patent: Jan. 10, 1989

[54] TESTING DEVICE FOR RESPIRATORY PROTECTIVE DEVICES

[75] Inventors: John F. Burt, Old Saybrook; Jeffrey M. Whynall, Haddam, both of Conn.; Jonathan Howe, Perry, Me.; Gilbert L. Knott, Portland; Tavin Harnvorakiat, Rocky Hill, both of Conn.

[73] Assignee: Biosystems Inc., Rockfall, Conn.

[21] Appl. No.: 44,915

[22] Filed: Apr. 30, 1987

[51] Int. Cl.$^4$ ............................................. G01N 19/00
[52] U.S. Cl. ...................................... 73/168; 73/1 G; 128/202.22; 128/200.24
[58] Field of Search ...................... 128/202.13, 202.22, 128/200.24, 716; 73/1 G, 168

[56] References Cited

U.S. PATENT DOCUMENTS

| | | | |
|---|---|---|---|
| Re. 29,317 | 7/1977 | Mosley | 73/729 X |
| 4,146,025 | 3/1979 | Warncke | 73/40.7 |
| 4,267,721 | 5/1981 | Longenecker et al. | 73/1.6 |
| 4,430,893 | 2/1984 | Barkalow | 73/168 |
| 4,535,766 | 8/1985 | Baum | 128/202.22 X |
| 4,674,492 | 6/1987 | Niemeyer | 128/202.22 |

FOREIGN PATENT DOCUMENTS

| | | |
|---|---|---|
| 826540 | 12/1936 | France . |
| 851907 | 1/1940 | France . |
| 1198000 | 9/1959 | U.S.S.R. . |
| 823608 | 4/1981 | U.S.S.R. . |
| 1293633 | 10/1972 | United Kingdom . |
| 2652136 | 11/1976 | United Kingdom ........... 128/200.24 |

OTHER PUBLICATIONS

AGA Divator Test, 4/30/87.

Primary Examiner—William E. Wayner
Attorney, Agent, or Firm—Fishman, Dionne & Cantor

[57] ABSTRACT

Automated test equipment is provided that performs quantitive tests and operational checks on respiratory protective devices including self-contained breathing apparatus (SCBA). The testing device is comprised of a bench-top instrument cabinet containing electronic, electro-mechanical, and pneumatic components, a test head with the likeness of human form attached on top of the instrument cabinet, a detachable computer keyboard, and a pneumatic manifold and hose assembly. With the present invention, a layman operator can determine the readiness of the SCBA equipment for service. The present invention can also be used as a diagnostic tool during maintenance procedures.

38 Claims, 21 Drawing Sheets

TESTING DEVICE FOR RESPIRATORY PROTECTIVE DEVICES

BACKGROUND OF THE INVENTION

This invention relates to a device for testing the performance of respiratory protective devices, e.g. self-contained breathing apparatus. More particularly, this invention relates to a device for automatically performing tests on the critical functions of self-contained breathing apparatus without disassembly, with no special tools and without specially trained personnel.

Supplied air respirators are often worn by workers when exposed to highly toxic or oxygen deficient atmospheres. A self-contained breathing apparatus (SCBA) is a type of supplied air respirator. The most widely used type of SCBA supplies breathing air from a compressed air cylinder to the user.

A typical SCBA consists of the air cylinder, a first stage regulator which lowers the air pressure to approximately 120 psi, a chest mounted pressure gauge which enables the user to check his remaining air supply, a demand valve which supplies air in response to the user's inhalation, a face mask, and a warning device which alerts the user that only a fraction of his air supply is remaining.

There are many types of respiratory protective devices which utilize an airline running between a source of quality breathing air to the user.

In about 1970, a significant improvement was made in respiratory protective devices, with the introduction of positive pressure. The demand regulator was modified to continuously maintain a slight positive pressure (about 1 inch water column) in the facepiece. The idea was that all leakage would be outward from the facepiece, preventing inward leakage of contaminants.

For many years the performance of respiratory protective devices has been controlled by the U.S. Bureau of Mines, and more recently, by the National Institute for Occupational Safety and Health (NIOSH). For any respiratory protective devices to be used or sold in the United States, certain design and performance criteria must be met. These criteria include breathing resistance, and in addition for SCBA, pressure gauge accuracy, remaining service life indicator accuracy and service duration.

In order to perform the most critical of these tests, breathing resistance, an instrumented breathing machine is used. This machine consists of a test head connected to a piston assembly which functions as an artificial lung. As the piston moves in and out, exhalation and inhalation are simulated. The rate of piston movement is governed by a test curve which simulates human breathing. A pressure transducer is connected to the test head and data is recorded for all cylinder pressures.

There have been other ways to test the performance of SCBA in the field. The most common method is the use of a "regulator tester". This device measures the maximum flow which a regulator can deliver in the constant flow condition. While this and other similar tests can indicate a gross malfunction, it is not truly indicative of the performance required in actual use. Moreover, no testing devices are presently available for testing all vital functions of SCBA in a manner similar to actual use and which will give accurate and dependable results.

SUMMARY OF THE INVENTION

The above-described and other problems and deficiencies of the prior art are overcome or alleviated by the device for testing self-contained breathing apparatus of the present invention. In accordance with the present invention, automated test equipment is provided that performs quantitive tests and operational checks on respiratory protective devices including self-contained breathing apparatus. The present invention is intended to be used by SCBA end-users to assure that their SCBA equipment in the field meets and continues to meet accepted performance standards. The present invention includes a breathing-machine mode which can test any respiratory protective device.

The testing device of the present invention is comprised of a bench-top instrument cabinet containing electronic, electro-mechanical, and pneumatic components, a test head with the likeness of human form attached on top of the instrument cabinet, a detachable computer keyboard, and a pneumatic manifold and hose assembly. With the present invention, a layman operator can determine the readiness of the SCBA equipment for service. The present invention can also be used as a diagnostic tool during maintenance procedures.

The testing device of the present invention can test the breathing resistance on any type of respiratory protective device such as airline respirators, air purification masks and devices, and escape hoods.

In addition, the testing device of the present invention can test all vital functions of SCBA in a manner similar to actual use. At the conclusion of the tests, a hardcopy of the results are printed for permanent record keeping.

Significantly, at least the following tests can be performed at all tank pressures while consuming only a fraction of tank air capacity:

1. MASK LEAK CHECK—The presence of leaks in the facemask can be determined.
2. STATIC MASK PRESSURE—The steady-state pressure in the facepiece can be measured and displayed.
3. HI PRESSURE LEAK CHECK—Leaks in the air delivery system can be detected.
4. PRESSURE GAGE ACCURACY CHECK—Accuracy of the tank and chest-mounted pressure gauges can be determined.
5. REMAINING SERVICE LIFE INDICATOR ACCURACY—Low pressure warning system can be checked.
6. BREATHING RESISTANCE—Pressure in the facepiece can be measured at operating conditions simulating various workrates. Conformance to accepted standards is determined.

The above-discussed and other features and advantages of the present invention will be appreciated and understood by those skilled in the art from the following detailed description and drawings.

BRIEF DESCRIPTION OF THE DRAWINGS

Referring now to the drawings, wherein like elements are numbered alike in the several Figures.

DESCRIPTION OF THE PREFERRED EMBODIMENT

Figure 1:
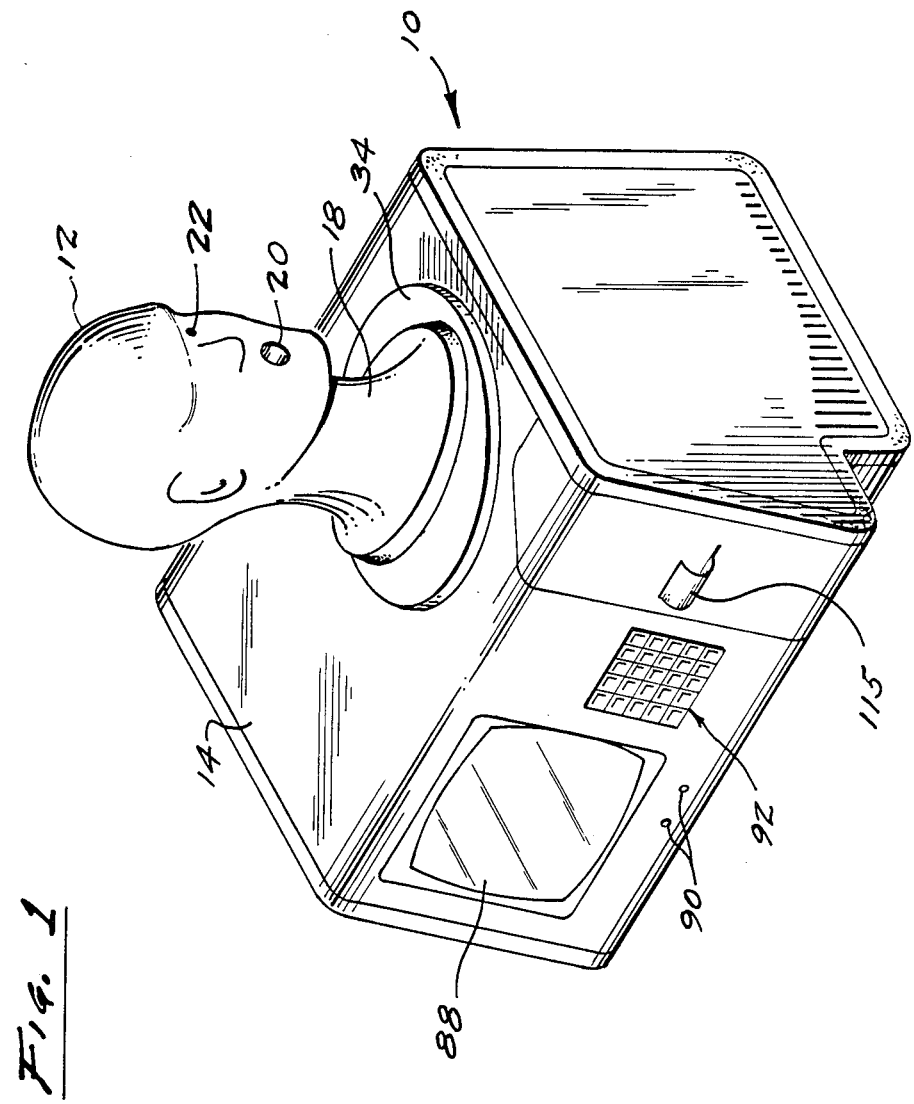
FIG. 1 is a perspective view of a SCBA testing device in accordance with the present invention.
Figure 2:
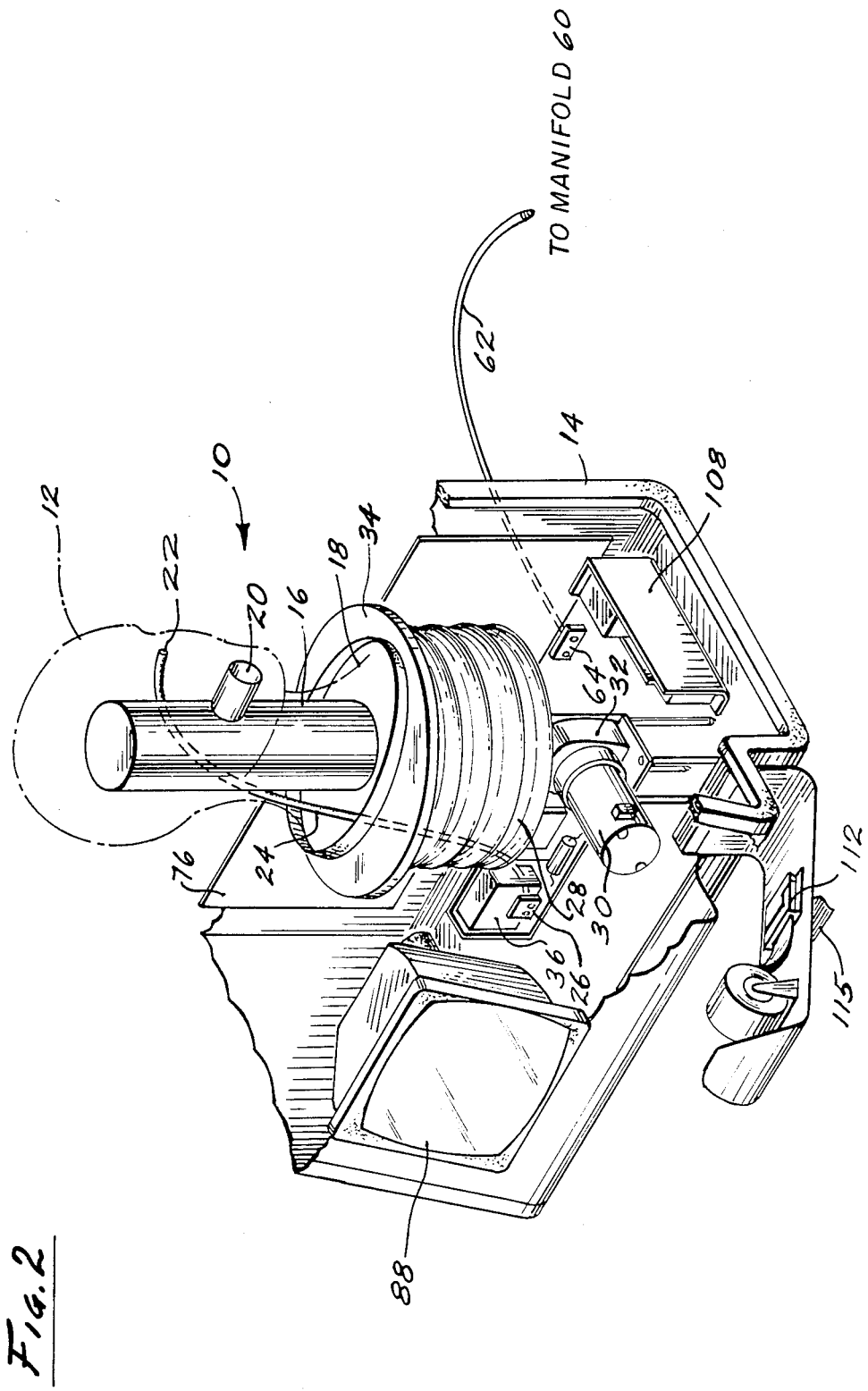
FIG. 2 is a perspective view of the testing device of FIG. 1 showing the interior components thereof.

Referring first to FIGS. 1 and 2, a self-contained breathing apparatus (SCBA) testing device in accordance with the present invention is shown generally at 10. Testing device 10 comprises four major components including a test head, breathing simulator (bellows mechanism), pressure-reducing manifold and electronics.

Still referring to FIGS. 1 and 2, a human form test head 12 is attached to the top of a cabinet or enclosure 14. It will be appreciated that during all phases of testing the performance of the SCBA, the facemask (see FIG. 3) of the SCBA is attached to test head 12. Head 12 has a breathing passageway 16 leading from the base of the neck 18 to an opening in the mouth 20. SCBA facemask pressure is measured by means of a static pressure port 22 located in the left eye of head 12. A tube 24 is connected to pressure port 22 and brings the facemask pneumatic signal to a differential pressure transducer 26 in the electronics enclosure 14.

A breathing simulator means provides air movement to the SCBA to simulate worker respiration. The breathing simulator means preferably comprises a bellows assembly including a bellows 28 (preferably having an effective inner diameter of 9 inches) which is associated with DC servo bellows drive 30 and linkage 32 therebetween. As shown in FIG. 1, the top of bellows 28 is sealed to the base 34 of test head 12 with the opposing end (bottom) of bellows 28 being capped by a circular baseplate (not shown). Bellows drive 30 is preferably a 20 RPM 100 ounce-inch DC gear motor which is connected to the baseplate of the bellows by a bell crank 32 which acts to move bellows 28 in a reciprocating motion. A DC power supply 36 is provided within cabinet 14 for supplying power to gear motor (bellows drive) 30.

Figure 3:
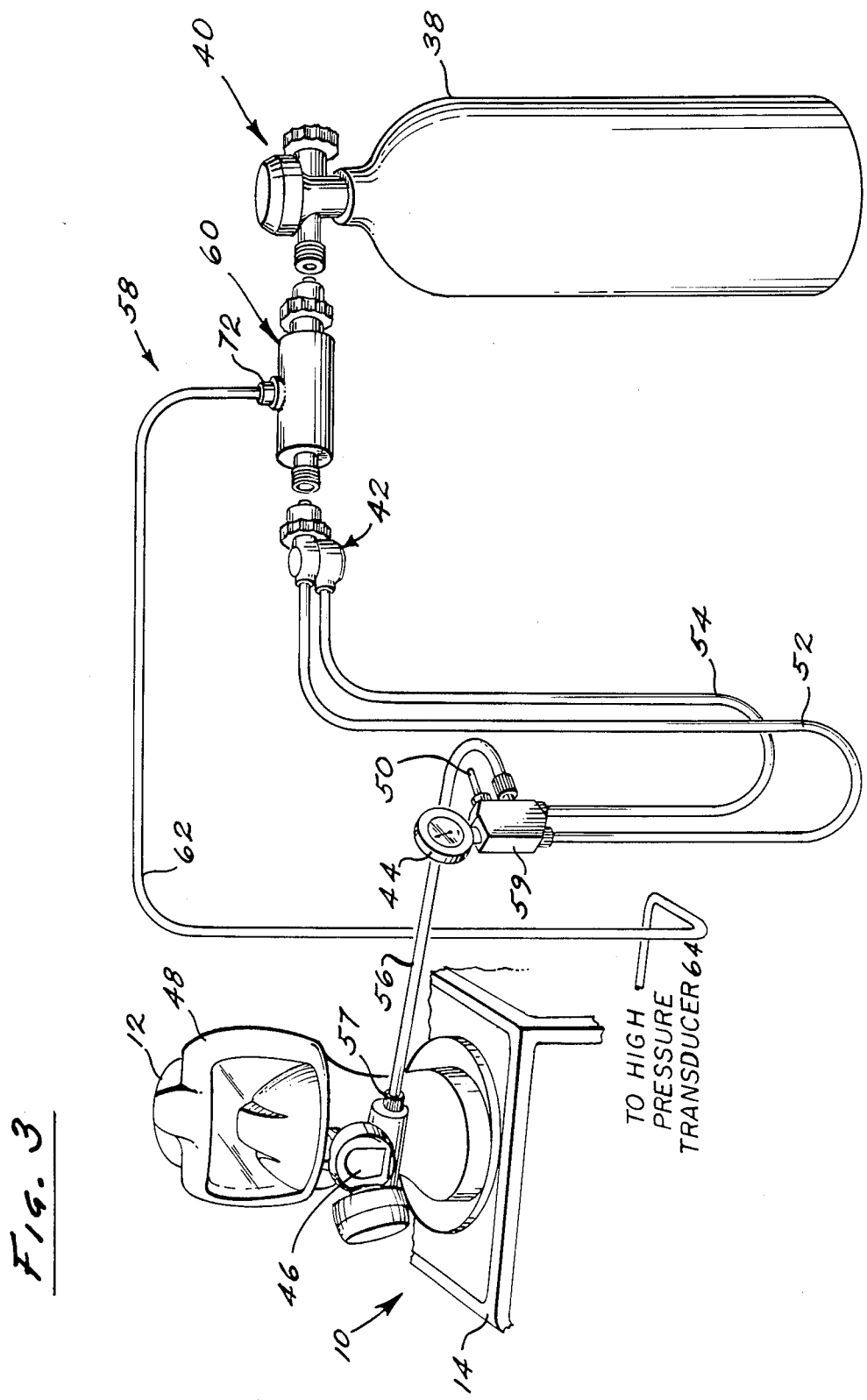
FIG. 3 is a perspective view of self-contained breathing apparatus attached to the test head of the SCBA testing device of FIG. 1.

Turning now to a joint consideration of FIGS. 1–4, and particularly FIG. 3, a well-known self-contained breathing apparatus is shown attached to test head 12 of SCBA testing device 10. The SCBA comprises an air cylinder 38 with associated valve 40, a first stage regulator 42 which lowers the air pressure in the tank to approximately 120 psi, a pressure gauge 44 which enables the user to check the remaining air supply, a demand valve 46 which supplies air in response to the user's inhalation, a face mask 48 and a low air warning device 50 which alerts the user that only a fraction of the air supply remains. Also, a pair of hoses 52 and 54 transfer the air supply between first stage regulator 42 and pressure gauge 44 and low air warning device 50, respectively. Another hose or conduit 56 is provided between a manual bypass 57 attached to valve 46 and the housing 59 for pressure gauge 44 and low air warning device 50.

It will be appreciated that the foregoing description of the SCBA components depicted in FIG. 3 is well known to those skilled in the art. It will also be appreciated that there is a need for a quick, efficient, reliable and accurate means of testing an SCBA such as is shown in FIG. 3 prior to it being used in the typically dangerous environments where it must be worn. Important tests which should be conducted on SCBA equipment to insure its reliability include (1) the presence of leaks in the facemask; (2) leaks in the air delivery system (i.e., various hoses 52, 54 and 56); (3) accuracy of the tank and chest mounted pressure gauges; (4) a check of the low pressure warning device 50; and (5) ensuring that the pressure in the facemask conforms to accepted standards. All of these various tests can be performed by the SCBA testing device of the present invention. In order to effect some of the tests however, a pressure-reducing manifold assembly 58 must be connected between valve 40 of tank 38 and first stage regulator 42 (normally regulator 42 is directly connected to valve 40).

Figure 4:
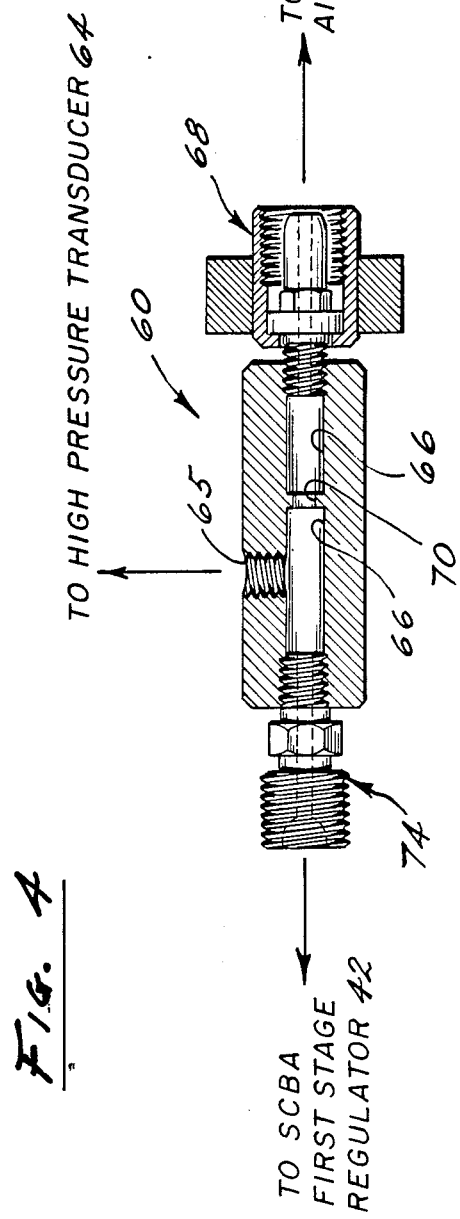
FIG. 4 is a cross-sectional elevation view of a manifold used in conjunction with the SCBA testing device of FIG. 1.

The manifold assembly 58 comprises a manifold 60 (see FIG. 4) having a hose 62 extending therefrom and attached to a high pressure manifold transducer 64 located within enclosure 14 (see FIG. 2). As shown in FIG. 4, manifold 60 includes a cylindrical housing having an opening 66 therethrough with a female pneumatic fitting 68 to accept the fitting on valve 40 of tank 38, a critical-flow orifice 70 associated with opening 66, a pressure transducer fitting 72 (having hose 62 attached thereto) received in bore 65 downstream of orifice 70, and a male pneumatic fitting 74 which accepts a female fitting on regulator 42. The various male and female connectors 68 and 74 are standard commercially available fittings. Hose 62 connects manifold 60 to manifold pressure tranducer 64 in enclosure 14. Preferably, transducer 64 includes a quick-disconnect fitting to facilitate tool-free setup.

As will be discussed in more detail with regard to the operation of the present invention, manifold assembly 58 is important as it allows testing of SCBA to be conducted at selectable simulated tank pressures. The relative diameters of the opening 66 and critical orifice 70 are important in obtaining this result. Preferred diameters of opening 66 are 0.440 inch while orifice 70 are 0.005 inch for 2250 psi SCBA; 0.003 inch for 4500 psi SCBA. An important feature of this invention is that the total volume of hose 62 and opening 66 is about 0.09 liters for low pressure (2250 psi SCBA) and about 0.045 liters for high pressure (4500 PSI).

Referring simultaneously now to FIGS. 1, 2, 4 and 5, the electronic components of the testing device of the present invention will now be discussed. The electronics include a computer circuit board 76 which is preferably 8 bit and comprises a microprocessor 78 (6809E), Random access memory 80 (16,384 bytes), video display generator IC 82, keyboard scanning peripheral interface adapter 84 and power supply circuits 86.

The computer main board 76 is interconnected to several other electronic components. Video display generator 82 is connected to a computer video monitor 88 comprising a monochrome screen having a 9 inch diagonal measurement. The monitor is provided to present menus and to display acquired data to the user. The computer 76 and monitor 88 are capable of displaying 256 dots horizontally and 192 dots vertically. As shown in FIG. 1, two monitor adjustment knobs 90 are provided to control the image on the screen.

Also connected to computer main board 76 is a 16 key operator's keypad 92. This keypad includes the numbers 0 through 9, "Alarm", "Enter", "Yes", "No", "Right Arrow", "Left Arrow", "Paper" and "Help" buttons thereon.

Figure 5:
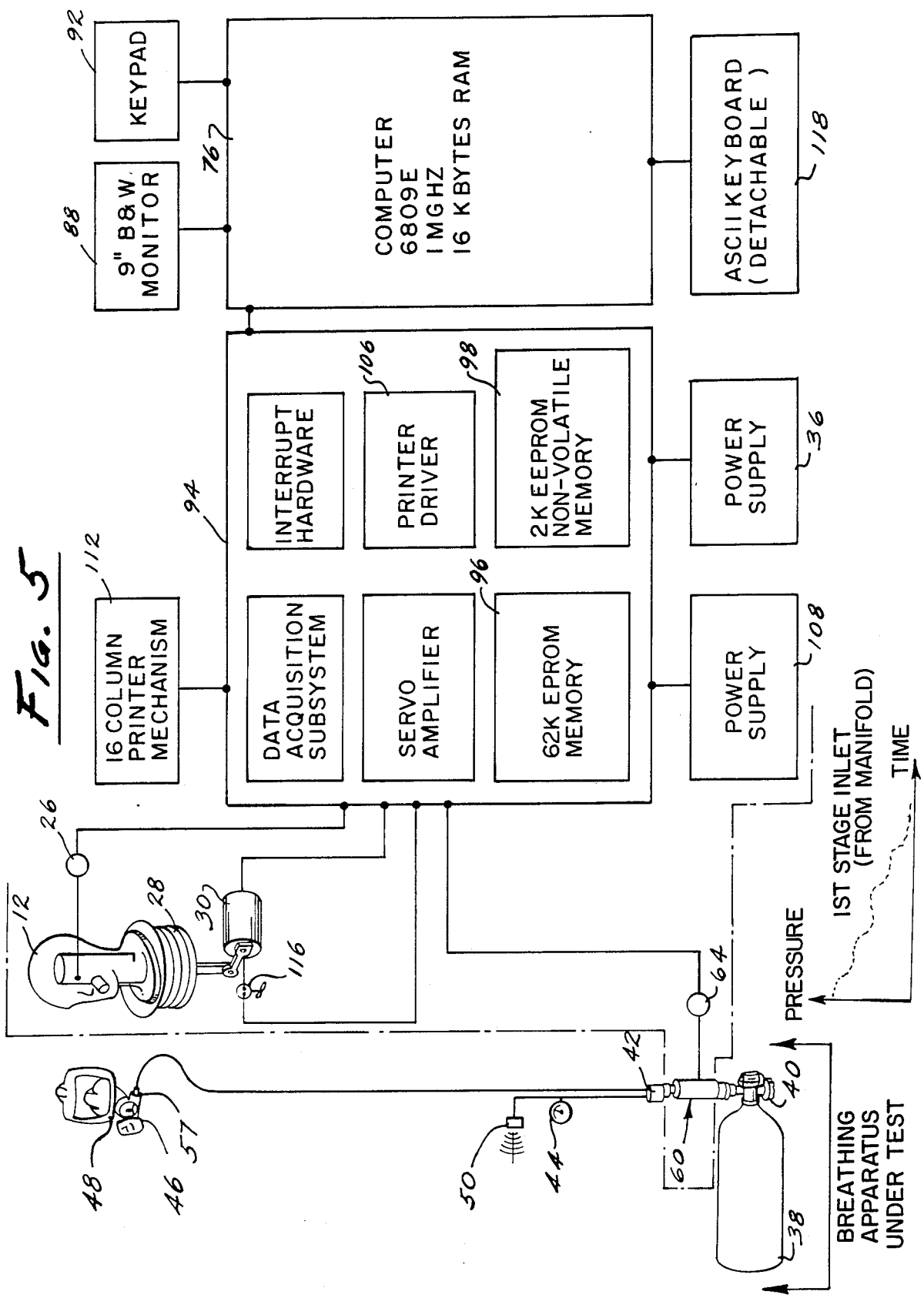
FIG. 5 is a diagrammatic view of the SCBA testing device of FIG. 1 showing the interface between the electronics and the pneumatic/electro-mechanical components.
Figure 6:
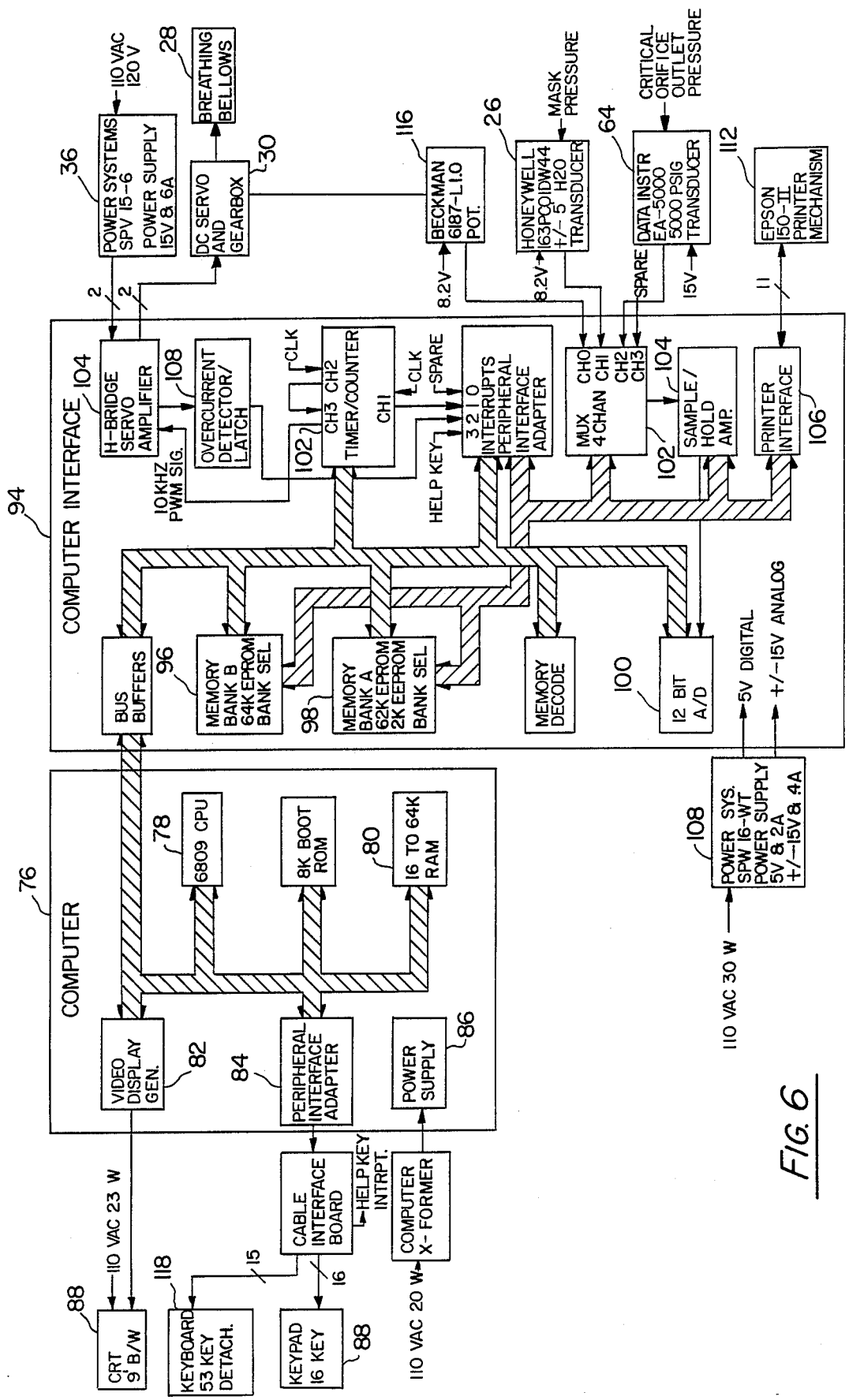
FIG. 6 is a schematic view of the electronic components of the SCBA testing device of FIG. 1.

The computer interface board 94 interfaces the computer main board 76 with various other components as is clearly shown in FIGS. 5 and 6. Interface board 94 includes the data, address and control bus buffer circuitry. Specifically, interface board 4 comprises 131,072 Bytes Erasable Prog Read Only Mem 96, 2048 Bytes Elec. Erasable Prog. Read Only Mem 98, 12 bit 35 Microsecond A/D Converter 100, 4 Channel Analog Signal Multiplexer 102, Sample-Hold Amplifier 104, 40 Column Impact Printer Drive Circuitry 100, 3 Channel 16 Bit Re-Loadable Counter/Timer I.C. 102, Four Quadrant Power MosFet PWM Servo Amplifier 104 and Servo Amplifier Over-Current Detector and Interrupt Latch 106.

A computer interface power supply 108 (+15 volts @ 0.4 Amp; −15 volts @ 0.4 Amp; and +5 volts @ 2.0 Amp) supplies power to computer interface board 94. As mentioned, a servo motor power supply 36 (+15 volts @ 6 Amps) supplies power to the servo motor 30.

Figure 20A:
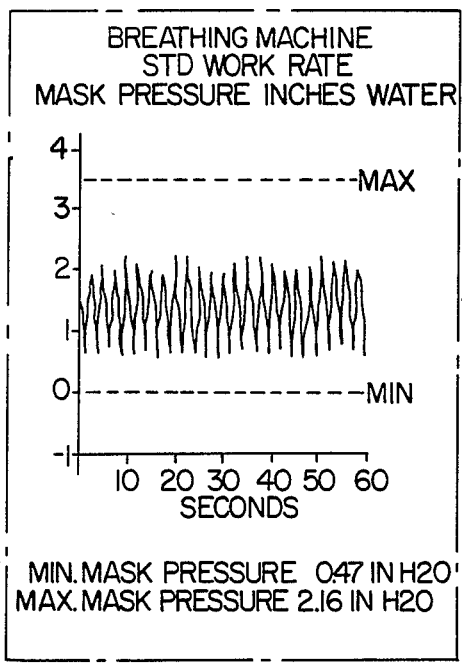
FIGS. 20A–C are printed records of test results obtained from the present invention.
Figure 20C:
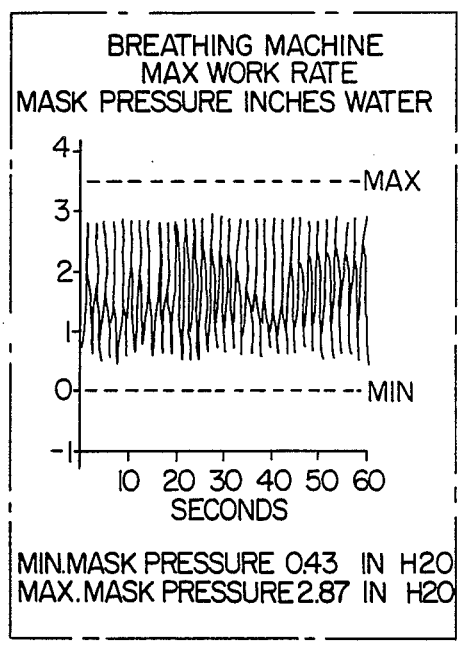
Figure 20B:
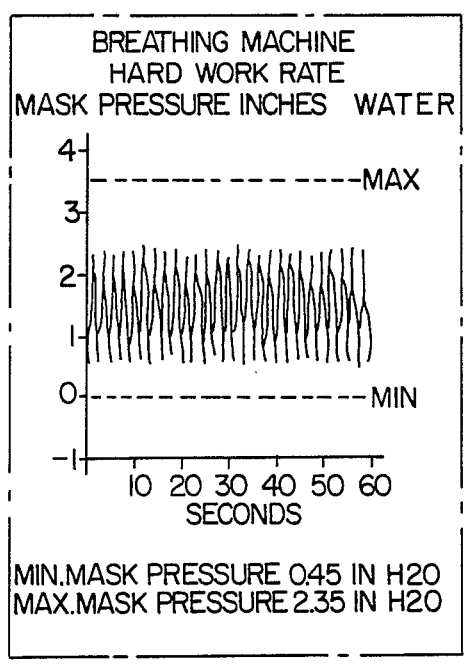
Figure 21:
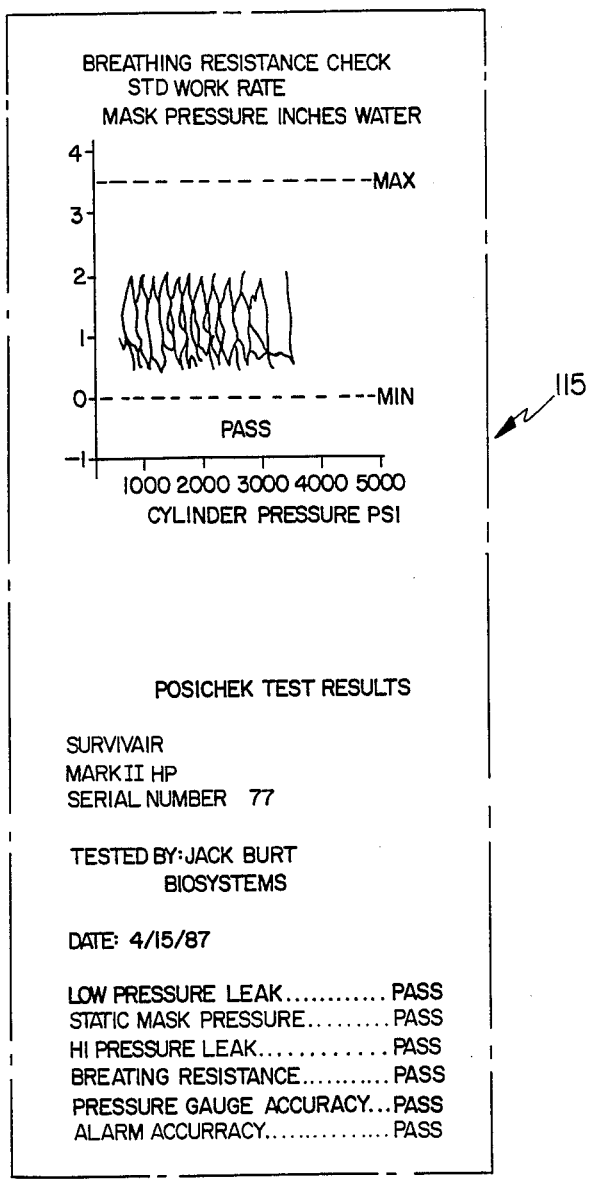
FIG. 21 is a printed record of other test results obtained from the testing device of the present invention.

A printer mechanism 112 is provided in enclosure 14 for printing out a ticket (printed record) with the testing results (see ticket 113A–C and 115 in FIGS. 20 and 21 respectively). Printer 112 is preferably a 40 column dot matrix printer.

As will be discussed in more detail hereinafter, the electronics of the present invention further comprises several sensing means including a previously described pressure transducer 64 (5000 PSIG). Transducer 64 has 0–5000 psi input range; 1 to 6 volts DC output and 1% static error band. As shown in FIGS. 5 and 6, transducer 64 measures the pressure from critical orifice outlet 65 of manifold 60. A second previously described pressure transducer 26 (also located in enclosure 14) measures the pressure in the face mask of the SCBA. Low pressure transducer 26 is a ±/−5 inch water column pressure transducer which has a −5 to +5 inches water input range; 1 to 6 volts output and 1% static error band. A position sensor 116 provides information on the location of servo motor 30 and hence breathing bellows 28. Position sensor 116 is a servo position feedback potentiometer with 10K ohms nominal impedance; 350 deg. nominal electrical travel and 1% linearity.

Figure 7:
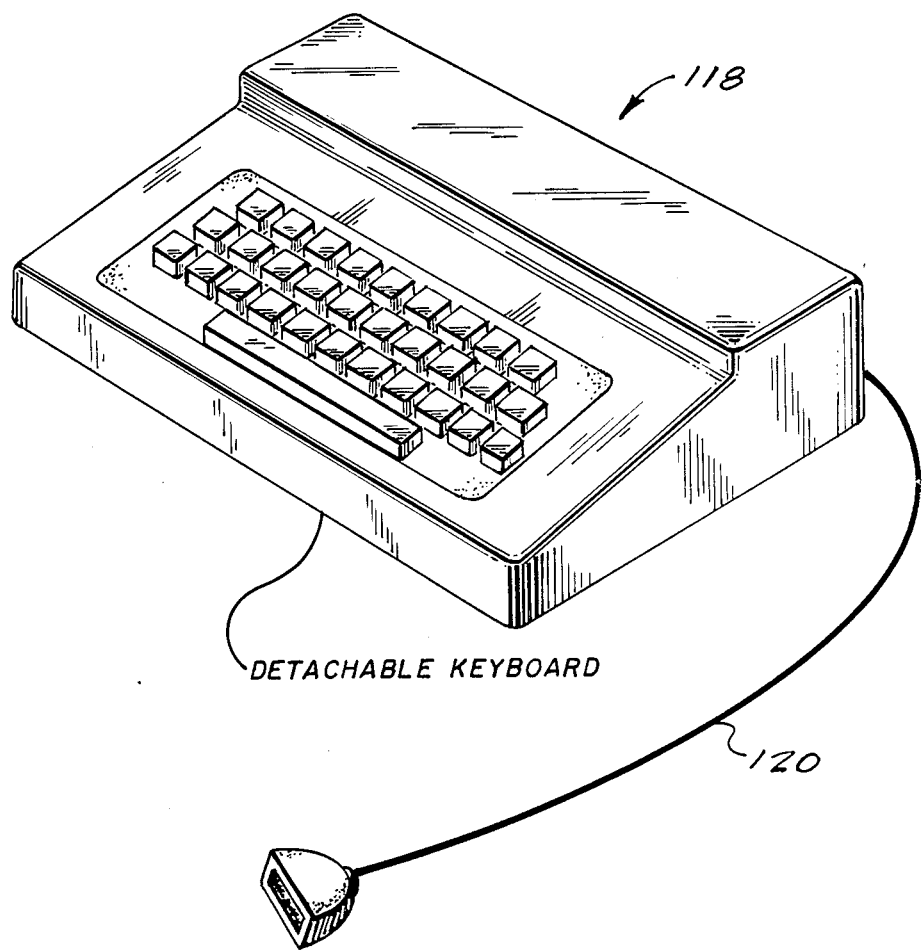
FIG. 7 is a perspective view of a detachable keyboard for use with the device of FIG. 1.
Figure 8:
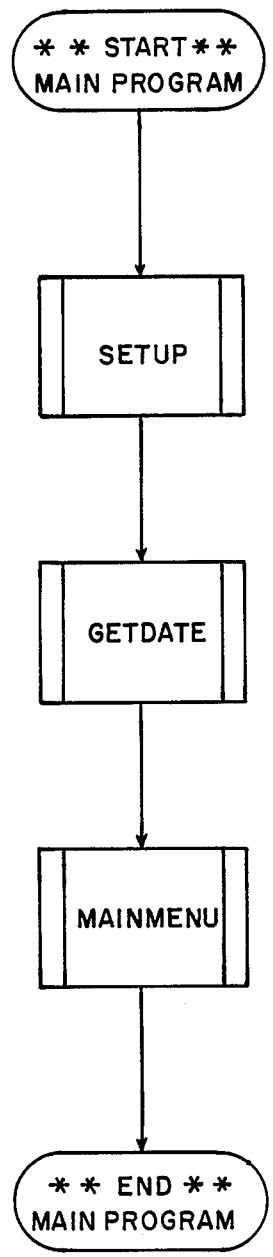
FIGS. 8–19 are flow charts of the computer program utilized in conjunction with the present invention.
Figure 9:
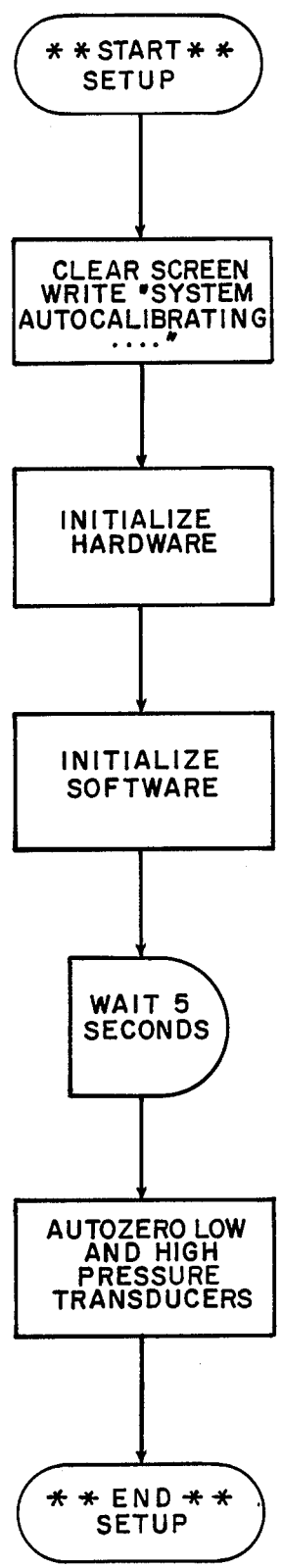
Figure 10:
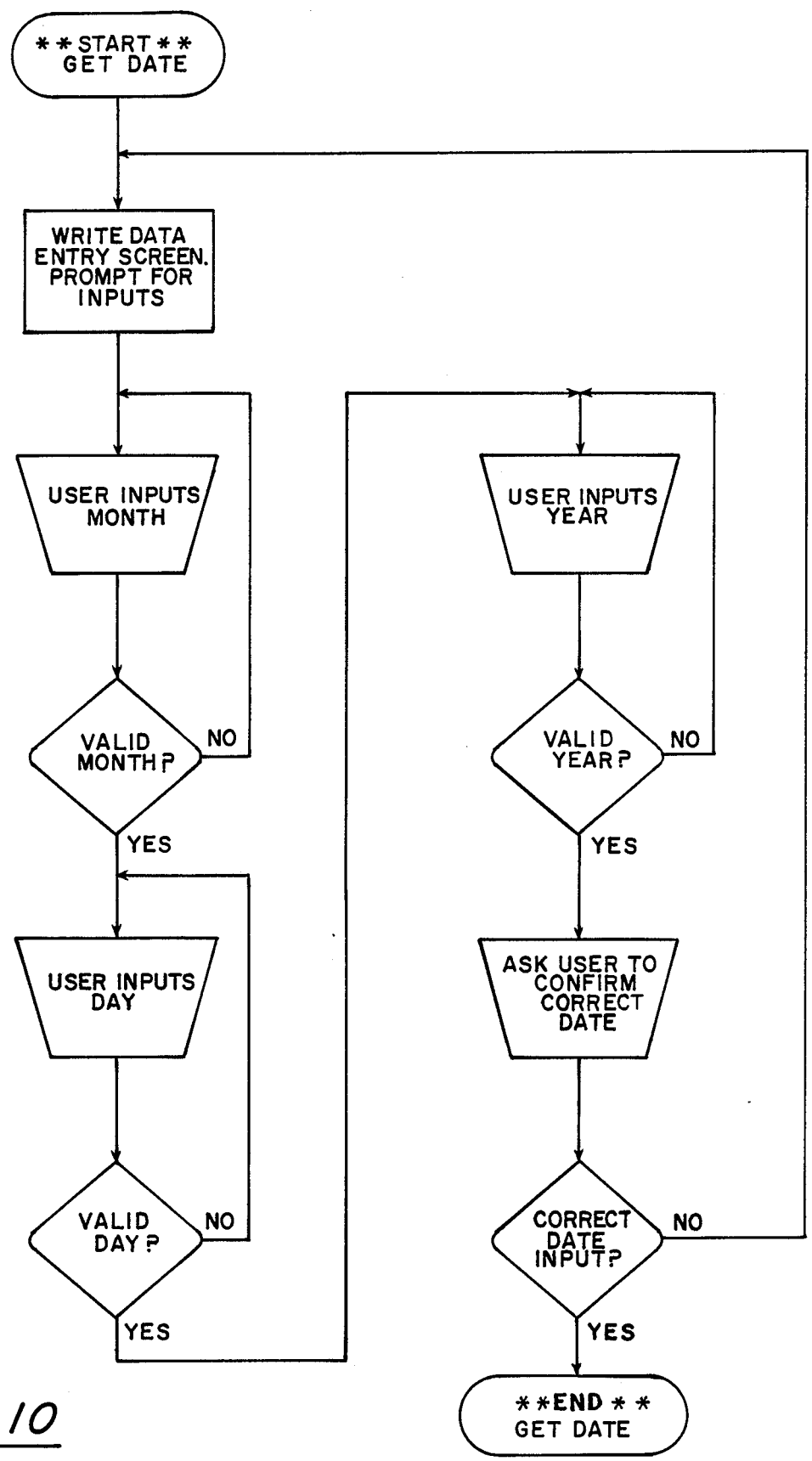

Finally, a detachable data entry keyboard 118 with connecting cable 120 (see FIG. 7) can be connected to the present invention via a front panel connector. Detachable keyboard 118 is used during initial set-up of the device to enter SCBA information and user information.

Figure 11:
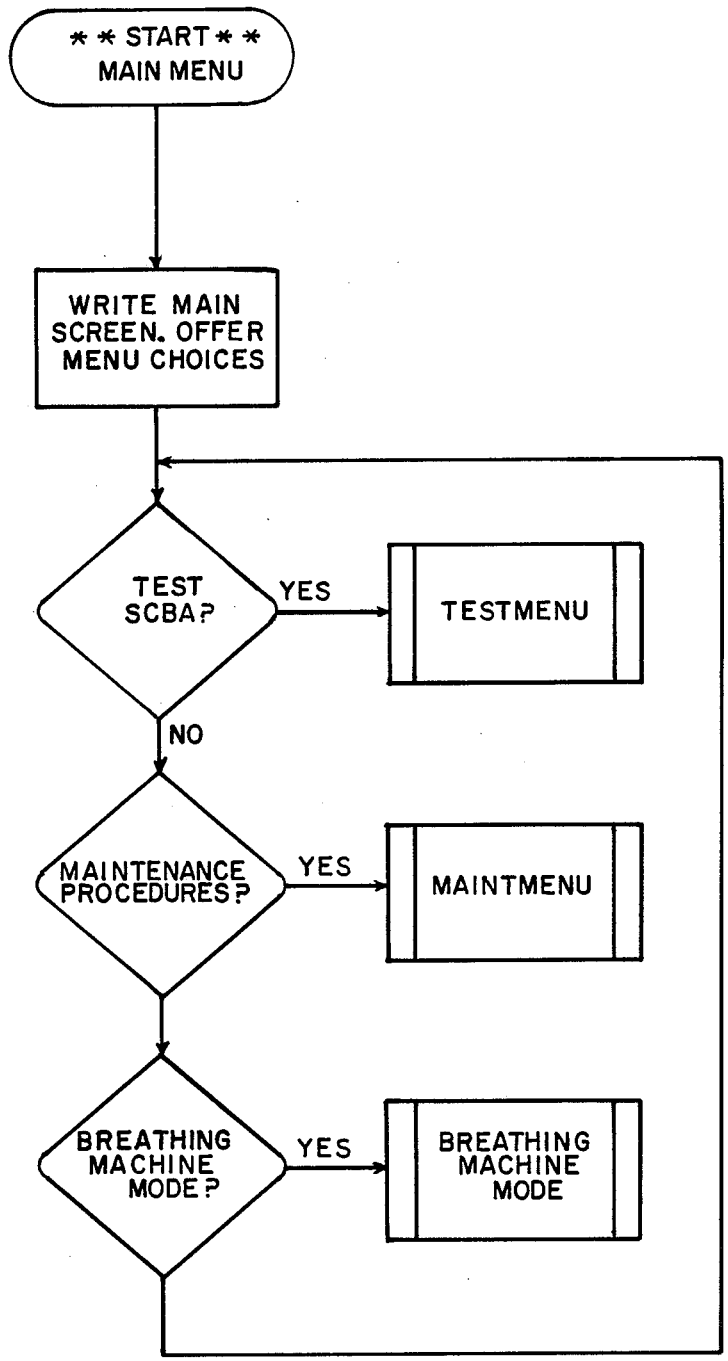

Software for the present invention is contained in the 128K bytes of EPROM and is written in PASCAL and 6809 Assembly language. High level tasks such as operator interface are implemented in PASCAL and run in the background while timing—critical tasks such as motor control and pressure data acquisition are performed by assembler routines in the foreground under interrupt control. Some software programs are all located together in either memory storage bank 96 or 98 of FIG. 6. Other programs are located separately in either memory storage bank 96 or 98 of FIG. 6. A PASCAL program selects the active memory bank. Software flow charts for the attached computer programs are set forth in FIGS. 8–19. FIGS. 8–11 are flow charts for the initial program sequences including main program (FIG. 8), hardware initialization and auto calibration (FIG. 9), date setting (FIG. 10), and main procedure (menu) selection (FIG. 11). The description of the flow charts in FIGS. 8–11 are clear from the drawing. The flow charts of FIGS. 12–19 will be discussed hereinafter with reference to the description of the testing procedures.

The operation of the testing device of the present invention will now be discussed with particular reference to FIGS. 3–5. Initially, the operation of pressure-reducing manifold 60 will be described.

Manifold 60 is interconnected between the SCBA air cylinder 38 and the SCBA first stage regulator 42 to allow testing to be conducted at selectable simulated cylinder pressures. The operation of manifold 60 is based on the fact that when the velocity of a compressible gas reaches the speed of sound in a restriction, the flow will not be increased by lowering the downstream pressure. Therefore, for a fixed orifice diameter and constant upstream pressure (cylinder 38 pressure), the flow will be constant regardless of the downstream pressure (manifold 60 pressure). To achieve a desired simulated cylinder pressure to conduct testing, the computer commands the bellows to breath at a rate greater than the choked flowrate until the desired pressure is reached. When the breathing rate is returned to the choked flowrate the pressure will be maintained about that point. Breathing rates faster or slower than the choked flowrate will cause the average pressure in the reservoir to fall or climb proportional to the difference. A different size orifice is included with manifolds for 4500 psi and 2250 psi cylinders and each is sized to provide a choked flowrate equivalent to the nominal NIOSH SCBA minimum performance rate of 40 liters per minute.

Turning now to a discussion of the electronics, upon power-up, the microprocessor beings execution of the application software contained in EPROM on interface board 94. The keyboard circuitry, the video display generator and memory decoding circuits on the main board are initialized. The timer/counter, printer circuitry, and the A/D circuitry is initialized on the interface board. The main PASCAL program is then begun and the operator is queried for desired operating modes.

Bellows 28 motion is effected by direct digital position control of DC gear motor 30. The computer senses the voltage of the motor feedback potentiometer 116 and calculates the position of the bellows. A lookup table containing command points of the desired shape breathing curve is accessed and an error is calculated. From the error, a corrective pulse-width is looked up in an error-to-pulse-width table. This process of detecting the actual position and correcting for errors is performed 288 times for each respiration cycle of the machine. Channel 1 of the counter/timer is hard-wired to the non-maskable interrupt. The non-maskable interrupt calls the motor control routine. Channel 1 controls the frequency of the interrupt, the interrupt controls the execution of the control routine. The speed of the bellows can therefore be controlled by adjusting the frequency of channel 1 of the counter/timer. Channel 3 of the counter/timer is programmed as a square wave oscillator with a frequency of 10 kilohertz. The output of channel 3 gates the input of channel 2 which is programmed as a monostable multivibrator (commonly called a one-shot). It is here that the pulse-width-modulated signal originates and can be adjusted on-the-fly periodically by the computer. The PWM frequency is set by channel 3 and is fixed at 10 kilohertz but the pulse width is set by channel 2 and is adjustable. The pulse-width is adjustable from 0 to 100 percent with one percent resolution. The PWM signal is input to a four-quadrant power mosfet H-bridge servo amplifier that controls the direction and speed of the motor.

Pressure data is acquired during the gear motor control routine and the update rate is software selectable up to 320 samples per second.

Test results are recorded on 40 column dot matrix printer mechanism 112. Printer motor current is switched by a power darlington that is enabled by a bit from the peripheral interface adapter on the interface board. Tachometer signals are signal conditioned by a zero crossing detector and are detected by another bit from the PIA. The Another bit from the PIA senses the closure of the carriage return reed switch. The four pin solenoids are actuated by four power darlingtons which are enabled by yet four other bits from the PIA. The microprocessor controls all timing and data calculations.

DATA STORAGE

Information about authorized users and SCBA can be stored in the test system of the present invention (see PASCAL procedure). Users' name, identification number, and company or affiliation may be entered on detachable keyboard 118 and stored permanently in the non-volatile (contents retained with power removed) memory of the device. The make, model, and pressure rating (2250 or 4500 psi) of SCBA normally to be tested by the users on the present invention may be entered permanently into the memory. The data may be changed at any time by attaching the data entry keyboard. The present invention is normally operated without the data entry keyboard attached. Data input to the computer is from the 18 key keypad 92 on the system front panel. A user identification number entered by the operator is checked against authorized users stored in memory. The operator inputs his name and company as well as the date and then selects SCBA type from a menu that is created from SCBA type entries in memory. For example, in FIG. 21, printout 115 shows the SCBA equipment being tested is SURVIVAIR, MARK II HP, Serial No. 77. The equipment is being tested by Jack Burt of BIOSYSTEMS on Apr. 15, 1987.

TEST DESCRIPTIONS

The following is a description of the tests that the present invention is capable of performing on respirator protective devices and SCBA. For all tests, it is assumed that the cylinder of air is nominally full and that the breathing gear is properly attached to the test head. For all tests except Breathing Machine Mode, it is assumed that pressure-reducing manifold 60 is interconnected between the breathing gear and the air cylinder.

A. BREATHING MACHINE MODE

Figure 12:
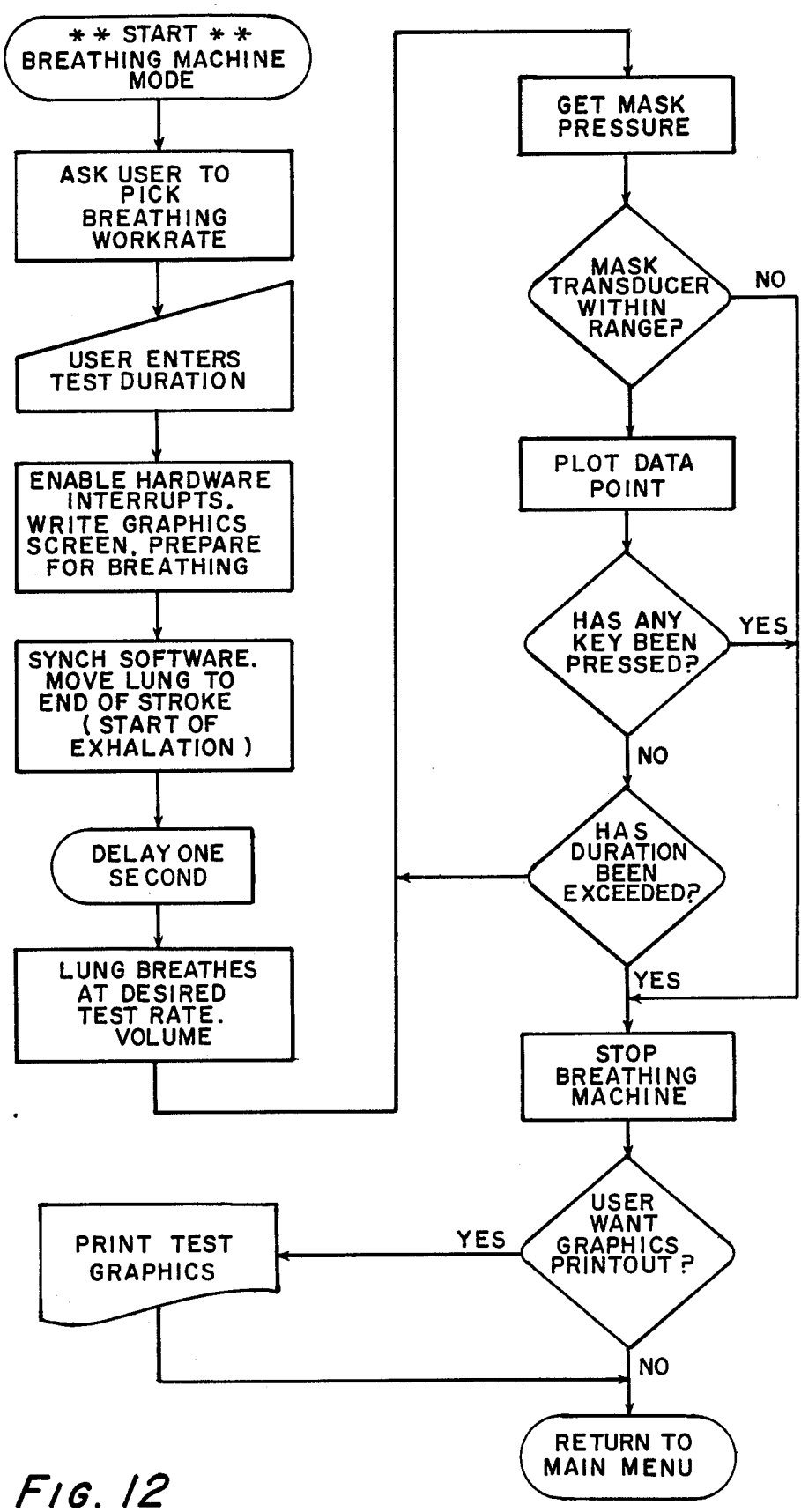

The present invention is capable of testing the breathing resistance of any type of respiratory protective device which includes a respiratory inlet cover (e.g., face mask). Pressure in the respiratory inlet cover is measured while the breathing machine simulates the respiration of a man engaged in light, moderate, or heavy work. The pressure-reducing manifold is not interconnected between the SCBA and the cylinder for this testing procedure. The user selects the workrate and length of time the test is to run. For the following discussion, refer to the software flowchart "POSICHEK BREATHING MACHINE MODE" (FIG. 12).

The test begins with the user opening the cylinder valve and entering in desired workrate and desired test duration. Available work rates are light (24 respirations/minute, 40 liter-minute volume), moderate (28 resp/min volume, 70 liter-minute volume) and heavy (32.2 resp/min, 100 liter-minute volume). The test duration is selectable from 6 seconds to 6 hours.

The lung is positioned at the beginning of the inhalation stroke and a delay of one second is allowed for system transients to decay. The machine is then commanded to breathe at the selected rate while respiratory inlet cover pressure is acquired and plotted on the graphics screen. Respiratory inlet cover (e.g., mask) pressure (inches water) is plotted on the y-axis while time in the appropriate units is plotted on the x-axis. The test is terminated when the selected time has expired.

No determination is made by the present invention as to the acceptability of the data, however, the accepted limits of 3.5 and 0 inches water column are noted on the graph by dotted lines. It is left up to the user to ascertain the acceptability of the acquired data.

Following the conclusion of the test, the graph may be printed on the 40-column printer. Examples of the test results for standard work rates, hard word rates and maximum work rates are shown at 113A, 113B and 113C in FIGS. 20A-C, respectively.

B. SCBA TESTS

Figure 13:
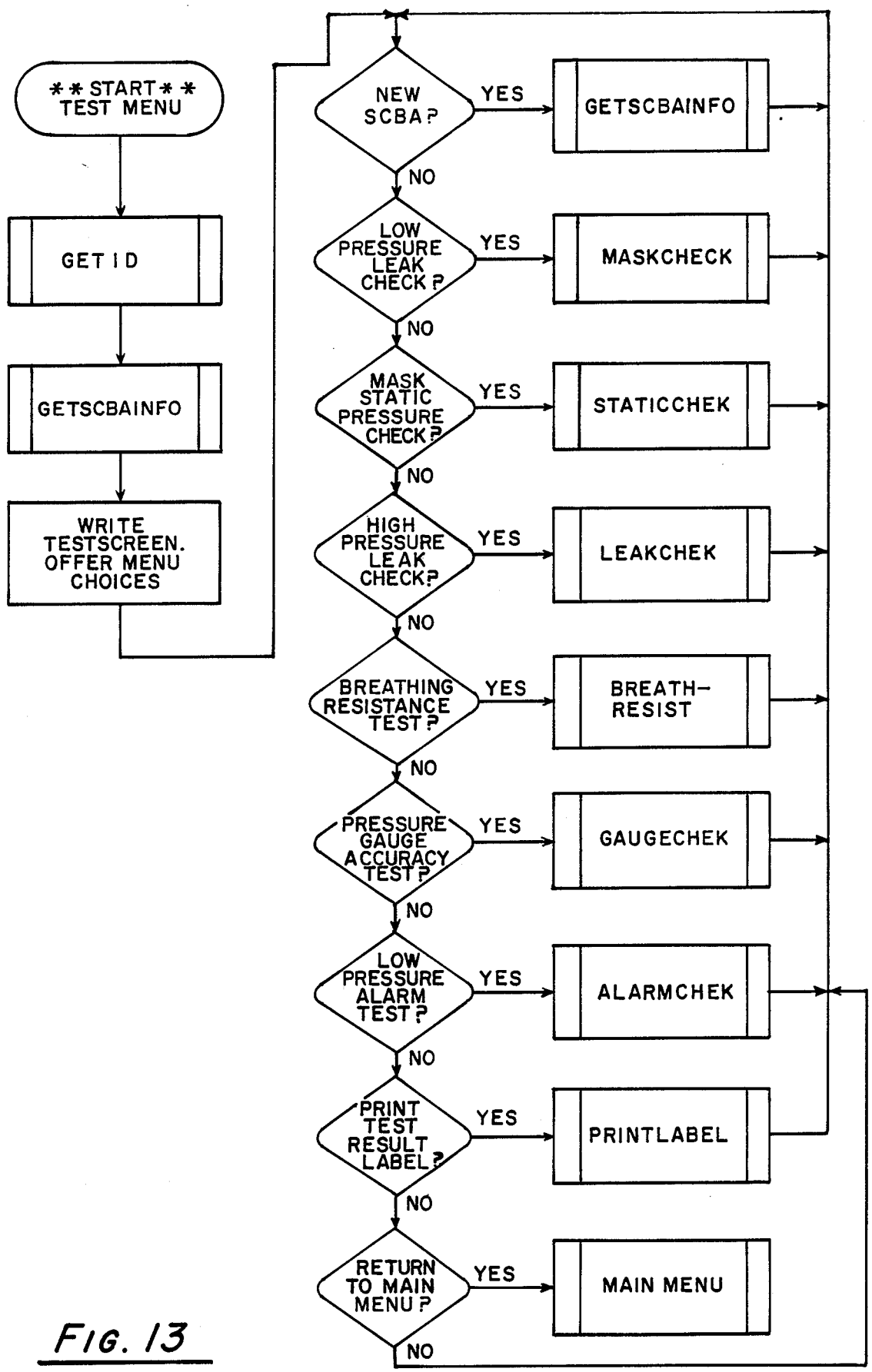

A software flowchart for the several tests which can be performed by the present invention is presented in FIG. 13. Also, reference should be made to FIG. 21 for a print out obtained from printer mechanism 112 showing the test results for the several testing procedures.

1. MASK LEAK

Figure 14:
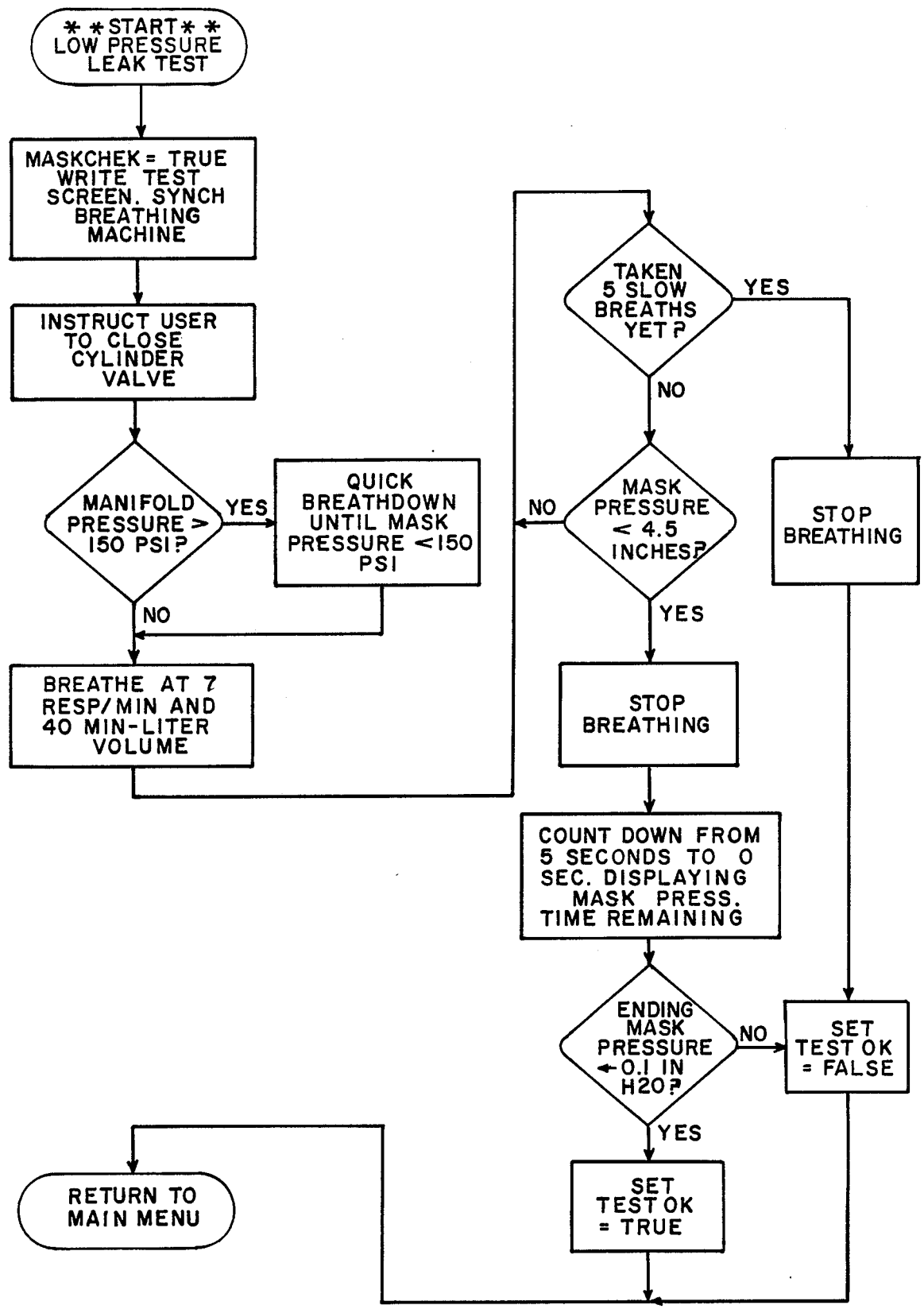

The presence of leaks in the facepiece can be determined. For the following discussion, reference should be made to the 10 software flowchart "POSICHEK MASKCHEK" (FIG. 14).

With the cylinder valve 40 closed, the lung is commanded to inhale, causing a vacuum to develop in the facepiece. When a pressure equal to 5 inches water column below atmospheric pressure is reached, the lung is halted and the pressure (vacuum) decay is measured. If the pressure is 0.1 inches water column or more below atmospheric pressure at the end of 5 seconds, the facepiece is considered to be free of significant leaks.

2. STATIC MASK PRESSURE

Figure 15:
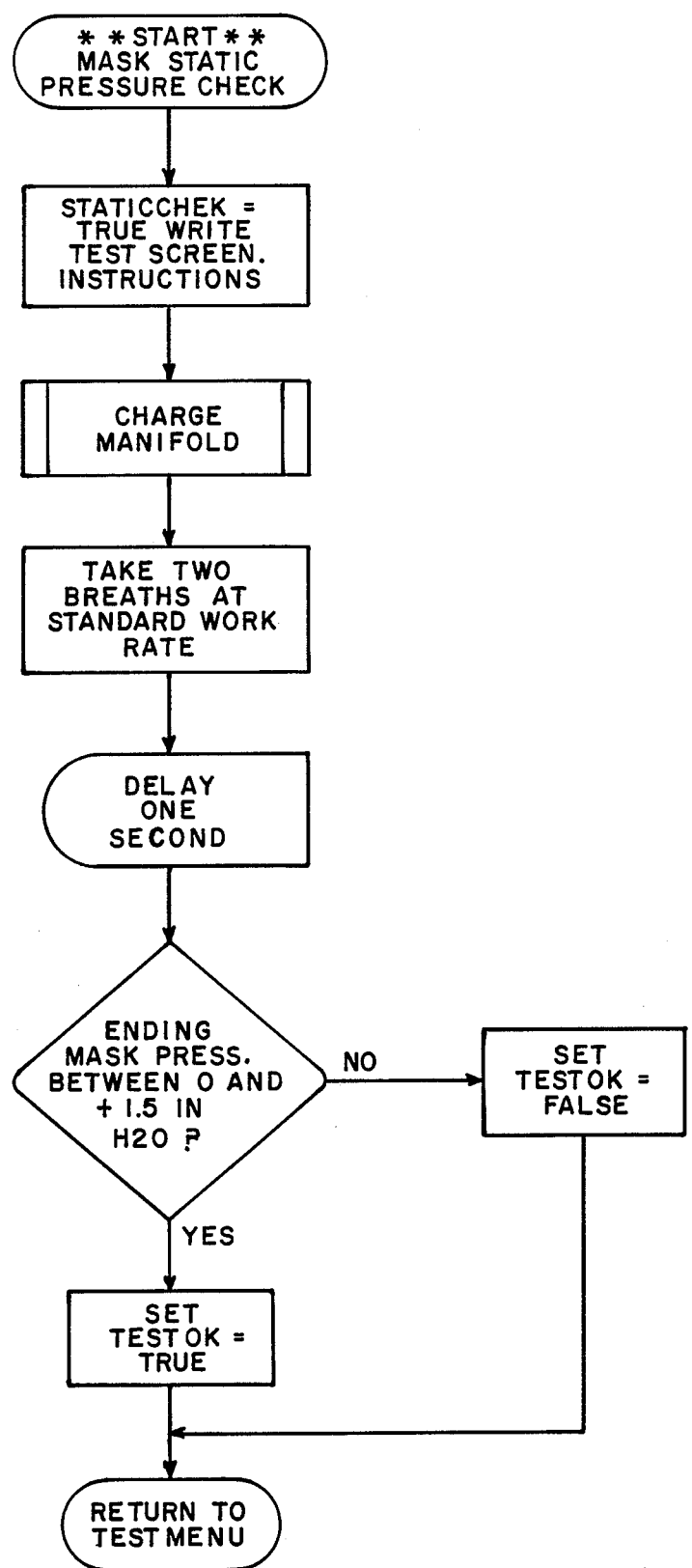

The steady-state (positive) pressure in the facepiece can be measured and displayed. For the following discussion, refer to the software flowchart "POSICHEK STATIC MASK PRESSURE CHECK" (FIG. 15).

The SCBA is exercised for 2 respirations at 24 respirations per minute and a 40 minute-liter volume. After a delay of 2 seconds to allow system transients to decay, the facepiece pressure is acquired. A static mask pressure greater than 0 and less than 1.5 inches water column is considered acceptable.

3. HI PRESSURE LEAK CHECK

Figure 16:
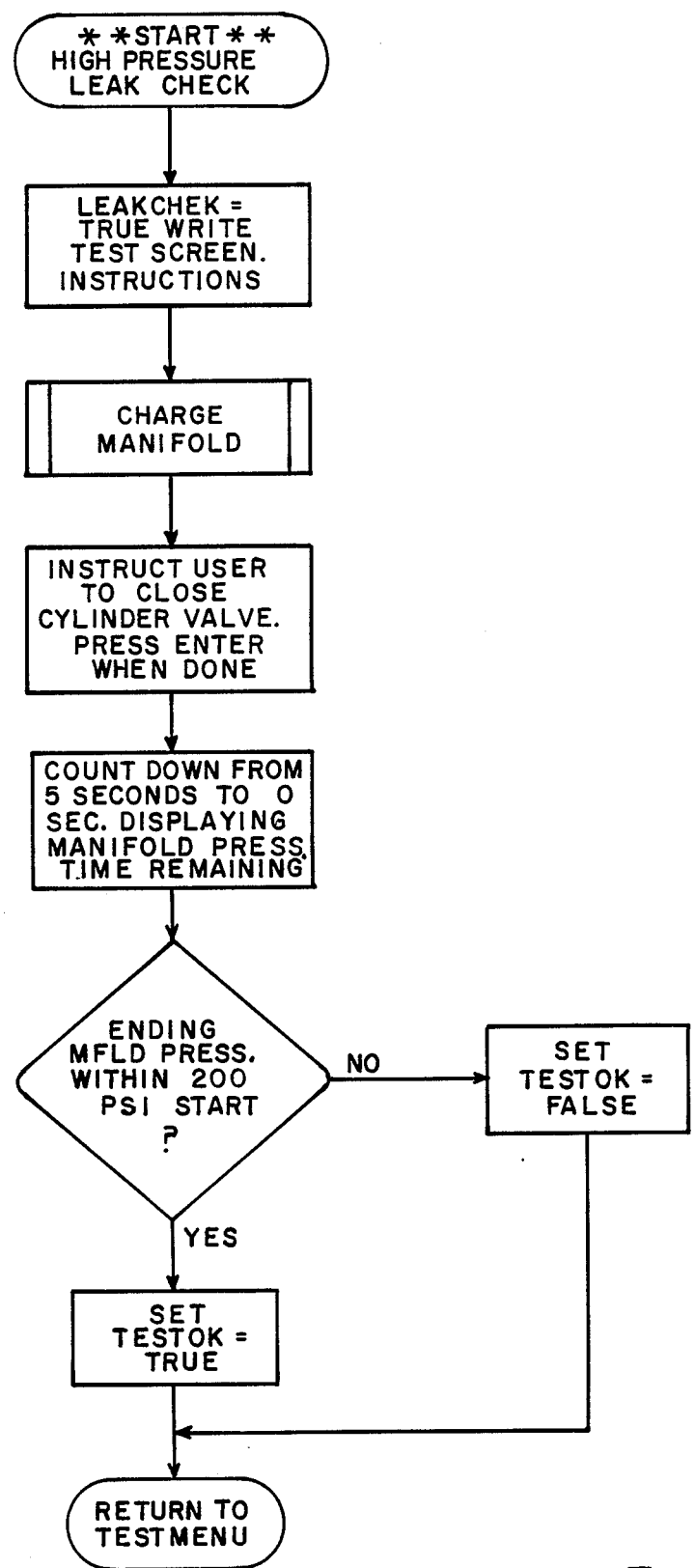

Leaks in the air delivery system can be detected. For the following discussion, refer to the software flowchart "POSICHEK HIGH PRESSURE LEAK CHECK" (FIG. 16).

The cylinder valve 40 is opened and the breathing gear and pressure-reducing manifold 60 are allowed to charge up to the cylinder pressure. The operator is then prompted to close the cylinder valve 40 and the manifold pressure is acquired. Following a delay of 5 seconds, the manifold pressure is again acquired. If the pressure in the system decayed less than 200 psi in the 5 seconds, then the high pressure leaks are considered to be negligible.

4. BREATHING RESISTANCE

Figure 17:
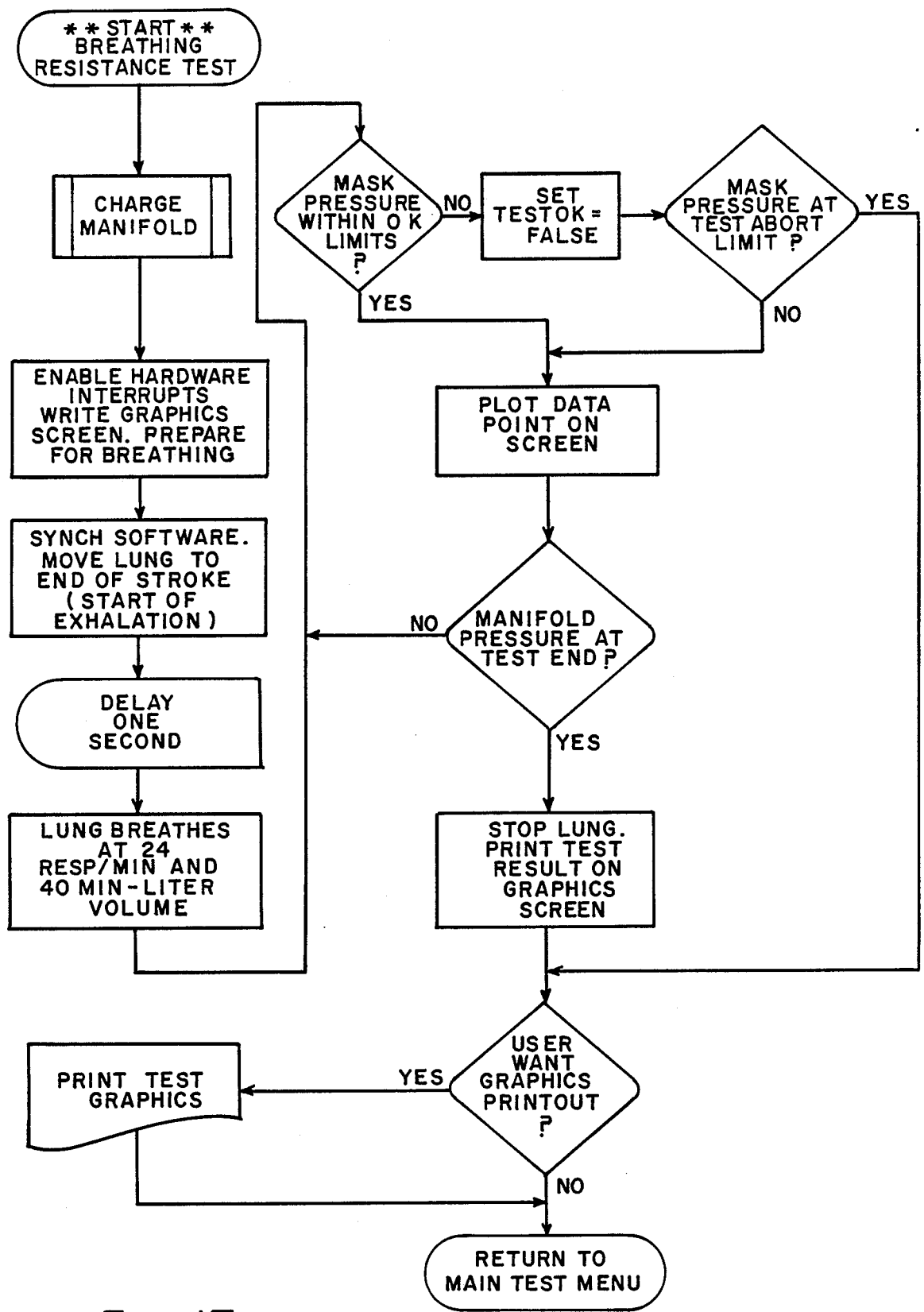

Pressure in the facepiece is measured while the breathing machine simulates the respiration of a man engaged in light, moderate and heavy work rates as discussed in the description of the Breathing Machine Mode. Testing is performed at simulated cylinder pressures of nominally full to 20 percent of nominally full. For the following discussion, refer to the software flowchart "POSICHEK BREATHING RESISTANCE CHECK" (FIG. 17).

The test begins by charging the breathing gear and pressure-reducing manifold to the cylinder pressure. The lung is moved to the beginning of the inhalation stroke and a delay of one second is allowed for the system transients to decay. The machine is commanded to breath while mask data is acquired and plotted on the screen. The x-axis of the graph contains manifold pressure (psi) while the y-axis contains mask pressure (inches water). Since the machine is flowing through the critical orifice 70 in the manifold 60, the pressure in the manifold slowly drops. The machine continues to breathe and data is acquired and plotted until the manifold pressure drops to 20 percent of a nominally full cylinder.

The performance of the SCBA is considered acceptable if the mask pressure remains positive but less than 3.5 inches water column with respect to atmospheric pressure.

At the conclusion of the test, the graph may be printed on the 40 column printer as shown in FIG. 21.

5. PRESSURE GAGE ACCURACY

Figure 18:
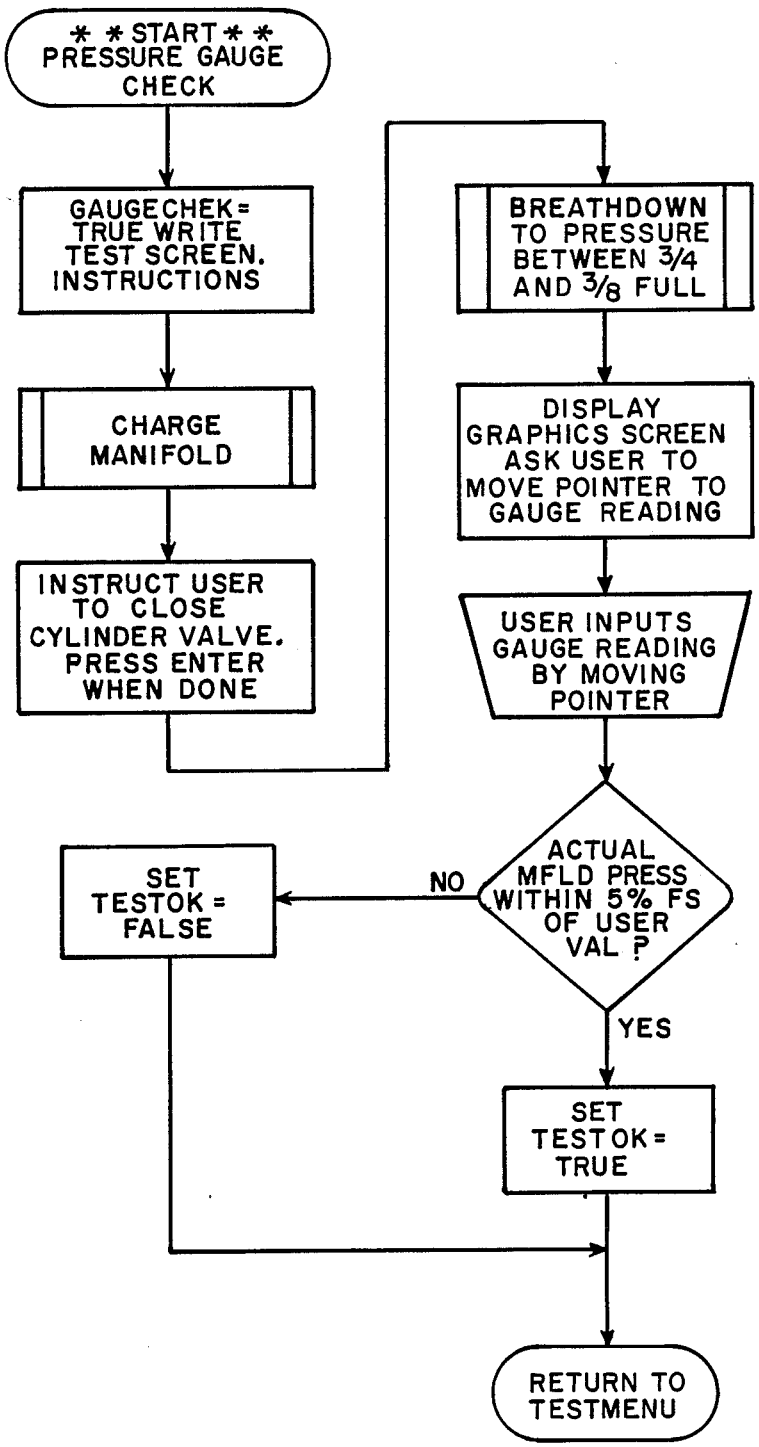

Accuracy of the chest-mounted pressure gauge is determined by comparing the gauge indication with pressure transducer 64. For the following discussion, refer to the software flowchart "POSICHEK PRESSURE GAUGE CHECK" (FIG. 18).

The test beings with the charging of pressure reducing manifold 60 to the cylinder pressure. The operator is prompted to close the cylinder valve 40 and the breathing machine is commanded to "breathe down" the pressure in the manifold to a random pressure between $\frac{3}{8}$ and $\frac{3}{4}$ of a nominally full cylinder. The operator is prompted to enter the indication of the chest-mounted pressure gauge into keyboard 92. The gauge is considered to be of adequate accuracy if agreement with transducer 64 is within 5 percent of a nominally full cylinder.

6. REMAINING SERVICE-LIFE INDICATOR

Figure 19:
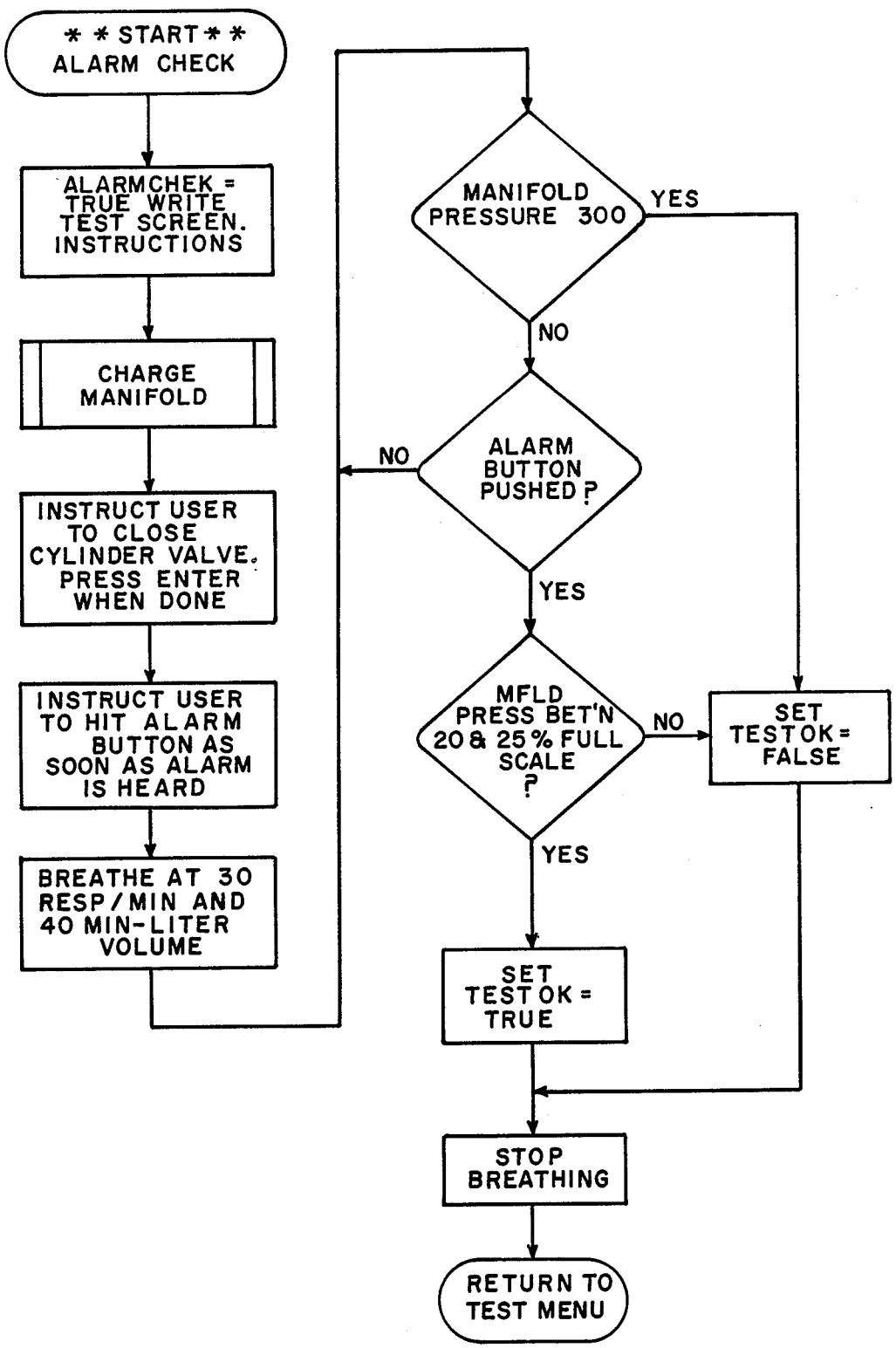

The cylinder pressure at which the remaining service life indicator becomes active is verified to be within 20 and 25 percent of the pressure of a nominally full cylinder. For the following discussion, refer to the software flowchart "POSICHEK ALARM CHECK" (FIG. 19).

The test begins by charging the pressure reducing manifold 60 to the cylinder pressure. The cylinder valve 40 is closed and the breathing machine is commanded to breathe at the nominal workrate. The operator depresses the "ALARM" button on the keyboard 97 when the remaining service life indicator is heard. At the instant that the "ALARM" button is pressed, the manifold pressure is acquired by the system. The condition of the remaining service life indicator is considered acceptable if the acquired pressure is within 20 to 25 percent of a nominally full cylinder.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. Apparatus for testing the performance of respiratory protective devices of the type including a respiratory inlet cover comprising:
   test head means, said test head means having at least a first orifice;
   breathing simulator means communicating with said orifice in said test head means wherein simulated respiration is provided to said test head means;
   first pressure sensor means communicating with said test head means for measuring pressure surrounding said test head means; and
   computer means communicating between said breathing simulator means and said first pressure sensor means.
2. The apparatus of claim 1 including:
   means for controlling the rate of speed of said breathing simulator means and for comparing said rate with the pressure measured by said first pressure sensor means when the respiratory inlet cover is provided onto said test head means.
3. The apparatus of claim 1 including:
   means for controlling the rate of speed of said breathing simulator means at a predetermined rate; and
   means for determining the pressure measured by said first pressure sensor means as a function of time when the respirator inlet cover is provided onto said test head means.
4. The apparatus of claim 1 including:
   video monitor means communicating with said computer means; and
   keyboard means communicating with said computer means.
5. The apparatus of claim 4 including:
   printer means communicating with said computer means for printing out test results.
6. The apparatus of claim 4 including:
   an enclosure having an interior and an exterior, said breathing simulator means, first pressure sensor means and computer means being housed in said interior, and said video monitor means, keyboard means and said test head means being mounted on said enclosure exterior; and first conduit means in said test head means communicating between said breathing simulator means and said orifice.

7. The apparatus of claim 6 including:
a pressure port in said test head means;
second conduit means communicating between said pressure port and said first pressure sensor means.

8. The apparatus of claim 1 wherein said breathing simulator means comprises:
bellows assembly means.

9. The apparatus of claim 8 wherein said bellows assembly means comprises:
a bellows;
a motor linked to said bellows for driving said bellows;
position sensor means communicating between said bellows and said computer means.

10. The apparatus of claim 1 including:
detachable keyboard means for inputing information to said computer means.

11. The apparatus of claim 1 wherein the respiratory protective device to be tested comprises self-contained breathing apparatus of the type comprising a face piece communicating with a regulator which in turn communicates with an air cylinder and including:
pressure reducing manifold means, said manifold means adapted for connection between the air cylinder and the regulator of the self-contained breathing apparatus; and
second pressure sensor means communicating between said pressure reducing manifold means and said computer means.

12. The apparatus of claim 11 wherein said pressure reducing manifold means comprises:
a housing having a first end and a second end and having an opening therethrough, said opening having a preselected diameter;
a first fitting associated with said first end;
a second fitting associated with said second end;
a critical flow orifice in said opening, said critical flow orifice having a preselected diameter which is smaller than said preselected diameter of said opening; and
a bore through said housing communicating with said opening downstream of said critical flow orifice, said bore adapted for connection to said second pressure sensor means.

13. The apparatus of claim 12 wherein:
said diameter of said critical flow orifice is between about 0.003 and 0.005 inch.

14. The apparatus of claim 11 including:
means for determining leaks in the face piece associated with the self-contained breathing apparatus when the face piece is attached to said test head means and said pressure reducing manifold means is connected between the air cylinder and the regulator.

15. The apparatus of claim 11 including:
means for determining steady state pressure in the face piece associated with the self-contained breathing apparatus when the face piece is attached to said test head means and said pressure reducing manifold means is connected between the air cylinder and the regulator.

16. The apparatus of claim 11 including:
means for determining leaks in the self-contained breathing apparatus when the face piece associated with the self-contained breathing apparatus is assembled onto said test head means and said pressure reducing manifold means is connected between the air cylinder and the regulator.

17. The apparatus of claim 11 including:
means for measuring pressure in the face piece associated with the self-contained breathing apparatus when the face piece is assembled onto said test head means and said pressure reducing manifold means is connected between the air cylinder and the regulator.

18. The apparatus of claim 11 wherein the self-contained breathing apparatus further includes at least one pressure gauge for measuring pressure in the air cylinder, and including:
means for measuring the accuracy of the pressure gauge associated with the self-contained breathing apparatus when the face piece is assembled onto said test head means and said pressure reducing manifold means is connected between the air cylinder and the regulator.

19. The apparatus of claim 11 wherein the self-contained breathing apparatus further includes a remaining service life indicator for indicating pressure in the air cylinder, and including:
means for determining the performance of the remaining service life indicator associated with the self-contained breathing apparatus when the face piece is assembled onto said test head means and said pressure reducing manifold means is connected between the air cylinder and the regulator.

20. Apparatus for testing the performance of self-contained breathing apparatus of the type including a face piece communicating with a regulator which in turn communicates with an air cylinder comprising:
test head means, said test head means having at least a first orifice;
breathing simulator means communicating with said orifice in said test head means wherein simulated respiration is provided to said test head means;
computer means communicating with said breathing simulator means;
pressure reducing manifold means, said manifold means adapted for connection between the air cylinder and the regulator of the self-contained breathing apparatus; and
first pressure sensor means communicating between said pressure reducing manifold means and said computer means.

21. The apparatus of claim 20 including:
video monitor means communicating with said computer means; and
keyboard means communicating with said computer means.

22. The apparatus of claim 21 including:
printer means communicating with said computer means for printing out test results.

23. The apparatus of claim 21 including:
an enclosure having an interior and an exterior, said breathing simulator means, first pressure sensor means and computer means being housed in said interior, and said video monitor means, keyboard means and said test head means being mounted on said enclosure exterior; and
first conduit means in said test head means communicating between said bellows assembly means and said orifice.

24. The apparatus of claim 20 wherein said breathing simulator means comprises:

bellows assembly means.

25. The apparatus of claim 24 wherein said bellows assembly means comprises:
a bellows;
a motor linked to said bellows for driving said bellows;
position sensor means communicating between said bellows and said computer means.

26. The apparatus of claim 20 including:
detachable keyboard means for inputing information to said computer means.

27. The apparatus of claim 20 wherein said pressure reducing manifold means comprises:
a housing having a first end and a second end and having an opening therethrough, said opening having a preselected diameter;
a first fitting associated with said first end;
a second fitting associated with said second end;
a critical flow orifice in said opening, said critical flow orifice having a preselected diameter which is smaller than said preselected diameter of said opening; and
a bore through said housing communicating with said opening downstream of said critical flow orifice, said bore adapted for connection to said second pressure sensor means.

28. The apparatus of claim 27 wherein:
said diameter of said critical flow orifice is between about 0.003 and 0.005 inch.

29. The apparatus of claim 20 including:
means for determining leaks in the self-contained breathing apparatus when the face piece associated with the self-contained breathing apparatus is assembled onto said test head means and said pressure reducing manifold means is connected between the air cylinder and the regulator.

30. The apparatus of claim 20 wherein the self-contained breathing apparatus further includes at least one pressure gauge for measuring pressure in the air cylinder, and including:
means for measuring the accuracy of the pressure gauge associated with the self-contained breathing apparatus when the face piece is assembled onto said test head means and said pressure reducing manifold means is connected between the air cylinder and the regulator.

31. The apparatus of claim 20 wherein the self-contained breathing apparatus further includes a remaining service life indicator for indicating low pressure in the air cylinder, and including:
means for determining the performance of the remaining service life indicator associated with the self-contained breathing apparatus when the face piece is assembled onto said test head means and said pressure reducing manifold means is connected between the air cylinder and the regulator.

32. The apparatus of claim 18 including:
second pressure sensor means communicating with said test head means for measuring pressure surrounding said test head means.

33. The apparatus of claim 32 including:
means for determining leaks in the face piece associated with the self-contained breathing apparatus when the face piece is attached to said test head means and said pressure reducing manifold means is connected between the air cylinder and the regulator.

34. The apparatus of claim 32 including:
means for determining steady state pressure in the face piece associated with the self-contained breathing apparatus when the face piece is attached to said test head means and said pressure reducing manifold means is connected between the air cylinder and the regulator.

35. The apparatus of claim 32 including:
means for measuring pressure in the face piece associated with the self-contained breathing apparatus when the face piece is assembled onto said test head means and said pressure reducing manifold means is connected between the air cylinder and the regulator.

36. The apparatus of claim 32 including:
means for controlling the rate of speed of said breathing simulator means and for comparing said rate with the pressure measured by said second pressure sensor means when the face piece is provided onto said test head means.

37. The apparatus of claim 32 including:
a pressure port in said test head means;
second conduit means communicating between said pressure port and said second pressure sensor means.

38. The apparatus of claim 32 including:
means for controlling the rate of speed of said breathing simulator means at a predetermined work rate; and
means for determining the pressure measured by said second pressure sensor means as a function as time when the face piece is provided onto said test head means.

* * * * *